(12) United States Patent
Barbe et al.

(10) Patent No.: US 10,746,913 B2
(45) Date of Patent: Aug. 18, 2020

(54) METHOD FOR PRODUCING A LIGHTING DEVICE AND RESULTING DEVICE

(71) Applicant: BROCHIER TECHNOLOGIES, Villeurbanne (FR)

(72) Inventors: Chris Barbe, Bonnefamille (FR); Cédric Brochier, Lyons (FR); Delphine Chevalier, Valence (FR); Julien Morange, Rillieux la Pape (FR)

(73) Assignee: BROCHIER TECHNOLOGIES (FR)

( * ) Notice: Subject to any disclaimer, the term of this patent is extended or adjusted under 35 U.S.C. 154(b) by 441 days.

(21) Appl. No.: 15/580,031

(22) PCT Filed: Jun. 6, 2016

(86) PCT No.: PCT/FR2016/051347
§ 371 (c)(1),
(2) Date: Dec. 6, 2017

(87) PCT Pub. No.: WO2016/198772
PCT Pub. Date: Dec. 15, 2016

(65) Prior Publication Data
US 2018/0143367 A1    May 24, 2018

(30) Foreign Application Priority Data

Jun. 8, 2015   (FR) ...................................... 15 55227
Aug. 5, 2015   (FR) ...................................... 15 57565

(51) Int. Cl.
*F21V 8/00*         (2006.01)
*D03D 1/00*         (2006.01)
(Continued)

(52) U.S. Cl.
CPC ............... *G02B 6/001* (2013.01); *D03D 1/00* (2013.01); *D03D 13/004* (2013.01); *D03D 15/00* (2013.01);
(Continued)

(58) Field of Classification Search
None
See application file for complete search history.

(56) References Cited

U.S. PATENT DOCUMENTS 3,508,589 A    4/1970   Derick et al.
6,450,678 B1   9/2002   Bayersdorfer
(Continued)

FOREIGN PATENT DOCUMENTS

DE          10206613 A1      8/2003
DE       102013002822 A1     8/2014
(Continued)

OTHER PUBLICATIONS

PCT International Search Report and Written Opinion dated Aug. 2, 2016 from corresponding Application No. PCT/FR2016/051347, 13 pages.

*Primary Examiner* — Shawn Mckinnon
(74) *Attorney, Agent, or Firm* — Dilworth IP, LLC

(57) ABSTRACT

The invention relates to a method for producing a lighting device, comprising the steps of: (a) weaving a fabric comprising warp and weft yarns that form the core of the fabric, weft- or warp-woven optical fibres within the fabric, said optical fibres being formed by a core and a sheath surrounding the core, and binding yarns forming part of the warp or weft yarns, maintaining the optical fibres inside the fabric; (b) treating the surface of the fabric comprising the binding yarns in order to form surface modifications on the surface of the fibres; (c) removing the optical fibres fully from the treated textile; and (d) inserting a portion of the fibres, grouped together in a bundle, into a translucent casing.

16 Claims, 4 Drawing Sheets

(51) Int. Cl.
*D03D 13/00* (2006.01)
*D03D 15/00* (2006.01)
*G02B 6/04* (2006.01)
*G02B 6/02* (2006.01)
*G02B 1/04* (2006.01)

(52) U.S. Cl.
CPC ........... *D03D 15/0027* (2013.01); *G02B 6/04* (2013.01); *D10B 2331/04* (2013.01); *D10B 2401/20* (2013.01); *G02B 1/045* (2013.01); *G02B 6/02071* (2013.01)

(56) References Cited

U.S. PATENT DOCUMENTS

| | | | |
|---|---|---|---|
| 8,215,810 | B2 | 7/2012 | Welch, Sr. et al. |
| 8,475,083 | B2 | 7/2013 | Dunn et al. |

FOREIGN PATENT DOCUMENTS

| | | |
|---|---|---|
| EP | 1221569 A1 | 7/2002 |
| FR | 2714147 A1 | 6/1995 |
| KR | 20090131127 A | 12/2009 |

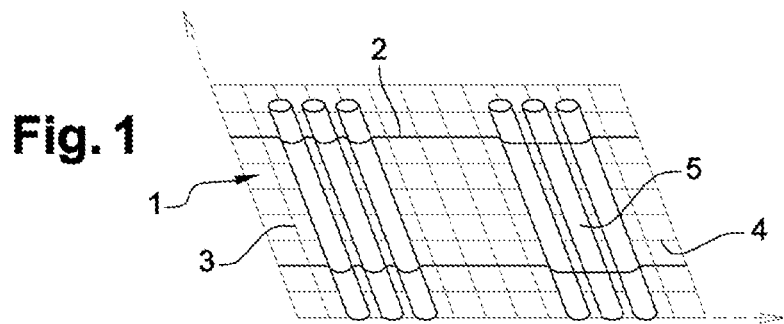
Fig. 1
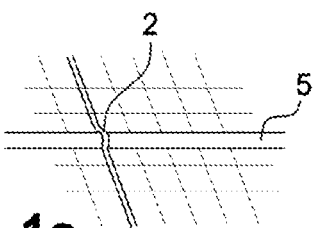
Fig. 1a
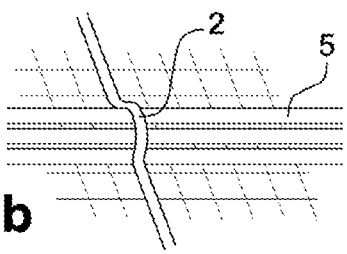
Fig. 1b
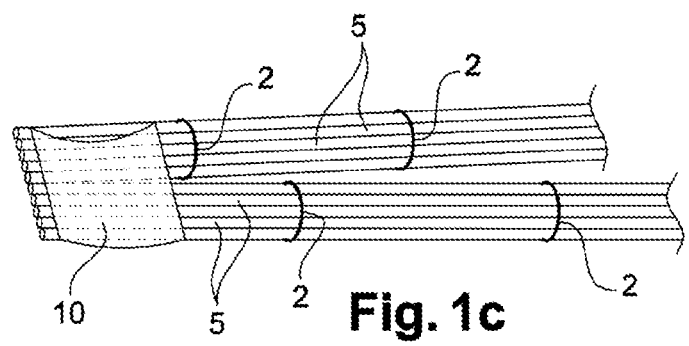
Fig. 1c
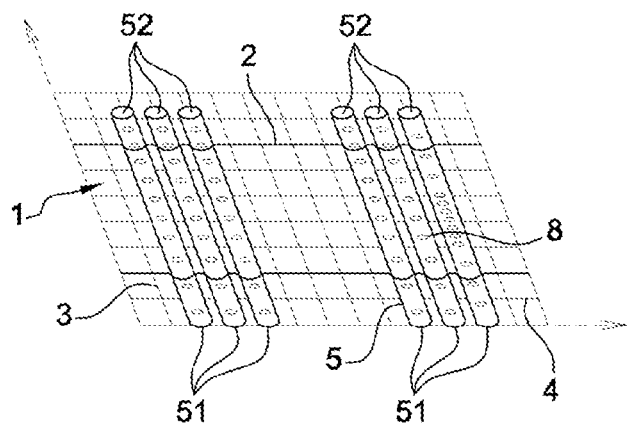
Fig. 2
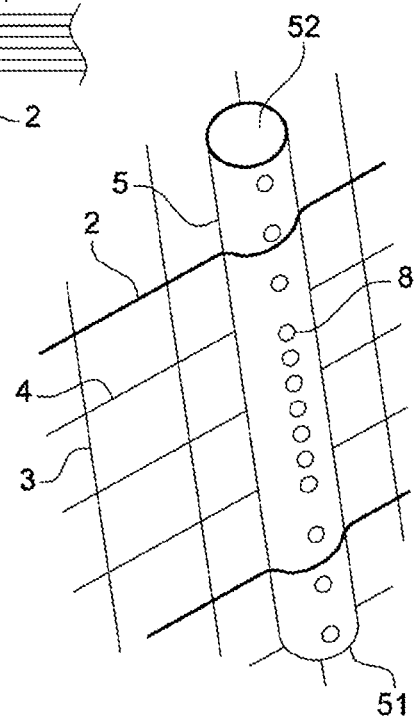
Fig. 2 bis

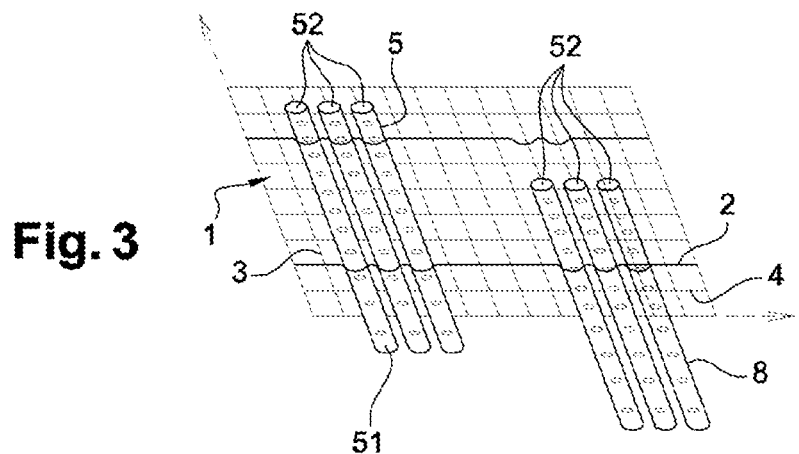
Fig. 3
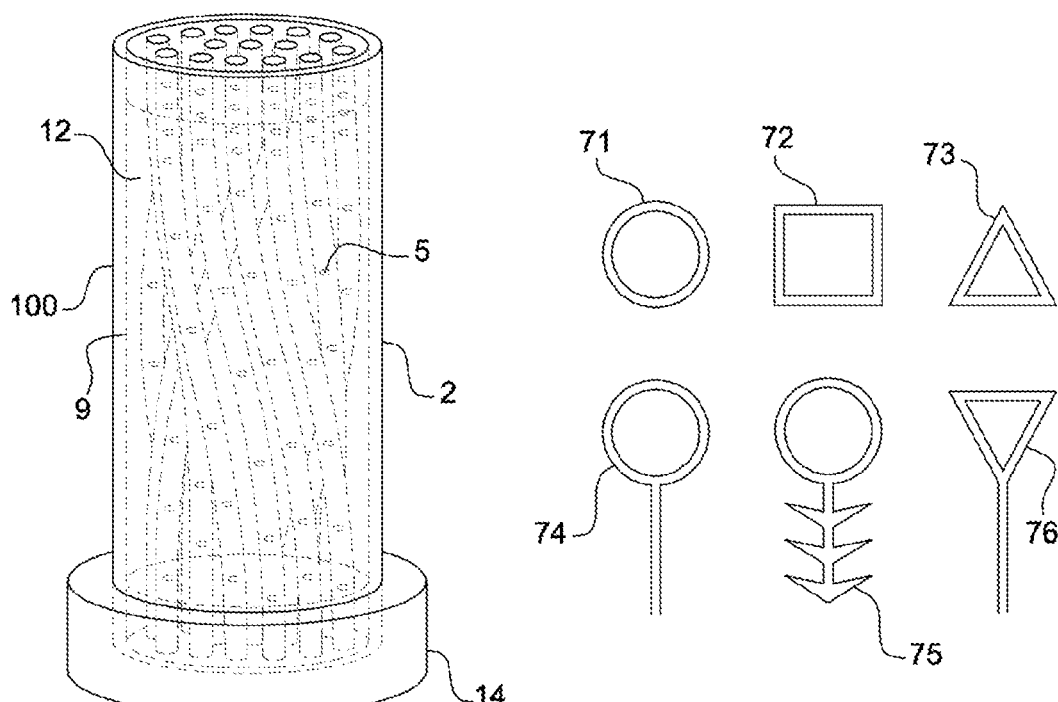
Fig. 4
Fig. 5

METHOD FOR PRODUCING A LIGHTING DEVICE AND RESULTING DEVICE

TECHNICAL FIELD

The present invention relates to a method for reliably producing lighting devices on a large scale. The invention finds particular application in light-signaling, for example in the automotive, aerospace construction or medical domains.

BACKGROUND OF THE INVENTION

Lighting devices based on optical fibres are well known in the prior art. These optical fibres generally consist of a core and an outer sheath surrounding the core.

Document U.S. Pat. No. 8,215,810 describes lighting devices constituted by a translucent casing and a plurality of optical fibres based on poly(methyl methacrylate) (PMMA) inserted into the casing to hold them in place. The optical fibres undergo a prior homogeneous treatment of their sheath in order to create surface modifications which expose their core. Thus, by connecting the fibres to a light source, some light propagates in the fibres and emerges through the surface modifications created in their sheaths. However, these devices have the disadvantage of not diffusing the light homogeneously along their entire length. Indeed, devices of too great a length notably show light attenuation as the light source gets further away. In this case, the intensity of light diffused within the device therefore decreases as a function of the distance relative to the light source.

To overcome this disadvantage, this document proposes an alternative consisting of placing a light source at each end of the lighting device. However, this alternative has limitations, since for long lengths, the problem remains identical. Furthermore, besides the cost and the complexity of the assembly, the light sources are generally not exactly alike, more particularly in terms of colour and intensity. A contrast in intensity and/or colour is therefore generated and visible in the lighting device. Thus, there is no known manufacturing method for the reliable production of this type of lighting device.

As taught by document U.S. Pat. No. 6,450,678, a lighting device comprising a casing including optical fibres based on PMMA having undergone a surface treatment to create surface modifications is also known. As described in this document, this device is used for light-marking the periphery of an object, for example a car seat. Once mounted, the device can therefore have highly curved areas, forming acute angles. So for the same density of surface modifications created on a sheath of an optical fibre, light escapes more significantly from an acute angle than from a straight section. The device, once mounted, therefore has areas of greater brightness that impact the quality of the desired marking. According to this document, the fibres are treated so as to avoid the appearance of such areas. The treatment of the sheaths of the fibres is thus adapted to the curvature that the lighting device undergoes when it is mounted on its support, typically a vehicle interior article. Notably, the number of surface modifications carried out in the sheaths of the fibres is decreased in the areas of fibres having greater curvature. Thus, the device is dedicated to a very specific application and requires either a manufacturing method specific to it, or the performance of additional or related steps, which are restrictive. This represents a significant disadvantage for the manufacturing of lighting devices on a large scale.

The method of forming surface modifications on the sheaths of optical fibres is known to a person skilled in the art. A known technique, for example described in document FR 2 714 147, consists of scrolling free optical fibres in a blasting cabinet where a nozzle spraying an abrasive under high pressure is positioned. To reliably obtain the expected result, it is therefore necessary to ensure controlled scrolling of the fibres in the cabinet, and to prevent them from bending during treatment under the effect of the high pressure exerted. This therefore assumes the use of a scrolling mechanism that pulls the fibres sufficiently to hold them in place during blasting, hence a risk of fibre breakage.

DESCRIPTION OF THE INVENTION

The aim of the invention is to propose a method for producing lighting devices, based on optical fibres surrounded by a sheath, enabling large scale, reliable, homogeneous or controlled non-homogeneous production and capable of being curved at acute angles without affecting the light intensity.

To this end, the aim of the invention is a method for producing lighting devices comprising the steps of:
a/ weaving a fabric, comprising:
  warp and weft yarns that form the core of the fabric;
  weft- or warp-woven optical fibres within the said fabric; said optical fibres being formed by a core and a sheath surrounding said core;
  binding yarns forming part of the warp or weft yarns, maintaining the optical fibres inside the fabric;
b/ treating the surface of the fabric in order to form surface modifications on the surface of said fibres;
c/ removing the optical fibres fully from the treated fabric;
d/ inserting a portion of said fibres grouped together in a bundle into a translucent casing.

"Surface modifications" is understood as meaning any modifications of the geometry and/or physico-chemical properties of the external sheath of the optical fibres, obtained by mechanical, thermal or chemical treatment, enabling the light propagating within the fibre to escape therefrom by said surface modifications.

In the remainder of the document, "binding yarn" means the warp or weft yarns enabling the optical fibres to be held within the woven textile. Said yarns protrude more strongly on the "front" face of the fabric, namely the surface directly exposed to the treatment, and they hold the weft- or warp-woven optical fibres.

In other words, the Applicant is proposing a method of manufacturing lighting devices which uses an intermediate weaving step enabling optical fibres to be positioned in a contiguous and identifiable way, which takes place by the separation of the optical fibres from the support textile and the destruction of the textile produced. The method of distributing the yarns within a fabric being precisely controlled, the method notably enables a support holding the optical fibres to be produced while precisely controlling their positions in the fabric. Being held and distributed in a precise way, the treatment of their surface is therefore easier and more reliable. In a single operation, it is possible to treat several tens to several hundreds of pieces (depending on their size). Furthermore, weaving techniques enable large areas of fabric to be produced automatically, which enables the production of large-scale lighting devices.

Within the textile, the optical fibres can be advantageously gathered into a bundle, or into a plurality of sub-bundles depending on the desired application. The assembly of fibres constituting a bundle are gathered at one of their ends into a ring enabling the bundle to be associated with a light source.

According to a particular embodiment, the lighting device may be composed of several sub-bundles of optical fibres inserted into the same casing, each of these bundles having undergone a particular treatment. When each of these sub-bundles is illuminated by a distinct light source, the light guide can then be used as a means of signalling, signposting or other.

In practice, the fabric serves as a way of holding the fibres during their treatment. The fabric is therefore able to withstand the stresses caused during the treatment of the fibres. The fabric thus has sufficient rupture-resistant properties for this type of treatment. For example, within the scope of blasting the fabric, the tension exerted to hold the fibres taut is distributed throughout the entire fabric. Thus the fibres are subjected to fewer mechanical stresses.

In practice, the number of binding yarns is significantly lower than the number of warp yarns, typically less than one hundredth, which enables the optical fibres to be held on the web of fabric, while facilitating the complete removal of the optical fibres from the fabric.

Said yarns form quasi-intermittent areas and enable the optical fibres to be mechanically held to a greater or lesser extent. Here, "quasi-intermittent area" means the fact that the surface of the fibre(s) covered by the binding yarn is negligible compared to the surface of the fibre(s) exposed to the treatment.

The number of binding yarns may be determined to take into account a compromise between the effective holding of the optical fibres on the fabric and the ease of extracting the optical fibres from the fabric after treatment. Thus, according to one embodiment, a binding yarn is inserted no more than every 100 to 150 warp or weft yarns, preferably no more than every 120 warp or weft yarns. In this way, the friction of the fibres on the fabric is negligible when the operator removes the optical fibres after the treatment is completed. Furthermore, the surface covered by the binding yarns to hold an optical fibre is very small, even negligible, relative to the total surface area of the fibre. Notably, for a weave constituted of yarns of 167 dtex with a number of binding yarns every 120 weft or warp yarns, although the fibre treatment is ineffective on the sections of optical fibres covered by the binding yarns, it has been observed that this discontinuity of treatment is invisible to the human eye. To the eye, the optical fibres behave as if they had been treated over their entire length.

Obviously, the number of binding yarns may be adapted, and can be varied over the width of the fabric, if the holding constraints are themselves variable over this same width.

According to one embodiment, the surface treatment step may be mechanical treatment by blasting. Mechanical treatment by blasting may modify the texture of the surface of the sheath surrounding the optical fibre core. A part of the light is thus diffused from the surface modifications giving the optical fibres lateral lighting properties. This type of treatment is advantageous since it enables the distribution of surface modifications along the lighting device to be controlled, by adapting the blasting speed, flow rate and pressure. Thus, more particularly it allows a number of surface modifications to be formed, which is a function of the light intensity within the device and the desired distribution.

As a variant, the surface treatment step may also be performed during an optical treatment by laser radiation. Treatment by laser radiation may also enable a number of surface modifications to be obtained as a function of the intensity of the light available within the device and the length of the optical fibres.

According to one embodiment, the optical fibres are inserted into a previously manufactured translucent casing. The translucent nature of the casing enables the light emitted by the treated optical fibres to pass through.

The casing may also be transparent, and therefore leaves the optical fibres clearly visible. In this case, the intensity of the light emitted by the device is all the more significant, but the optical fibres are visible.

A compromise is therefore to be found with the composition of the material, because otherwise, if the material is too opaque, it absorbs too much light and the device loses its effectiveness.

In practice, the casing is made from plastic and of a homogeneous composition. The material of the casing is advantageously chemically inactive relative to that of the sheaths of the optical fibres. In other words, the casing and the optical fibres are chemically compatible. Thus, the device does not spontaneously degrade.

In practice, the casing can adopt various geometries, according to its intended use, and notably the desired aesthetics. Advantageously, the interior geometry of the casing facilitates insertion of the optical fibres. In practice, a cylindrical cross-section, or more generally, a cross-section free from angular edges is favorable to the insertion of the optical fibres. The material constituting the casing has been developed to enable the insertion of the optical fibres into the casing without the use of lubricants.

Furthermore, the casing may also have means of holding in combination with a support.

Furthermore, the plastic material of the casing is sufficiently flexible to give minimum bend radius properties useful for this type of application. Indeed, the casing confines the optical fibres in a bundle that resists bending more effectively than if the bundle was exposed. The lighting device may thus mold to the varied and relatively undulating geometries of the elements intended to support it, without its curvature being too pronounced, or the optical fibres breaking leading to one or more spots of light or more generally an undesirable area of overintensity of light.

According to another characteristic of the invention, the lighting device comprises a ring into which the ends of the optical fibres are gathered. Said ring is intended to be positioned facing the light source of the device. The fibres are thus arranged facing the light source such as to maximize their exposure.

Advantageously in practice, the number of surface modifications on the sheath of the optical fibres, per unit of length, increases over the length of the fibre going from the first end towards the second end of the casing. This distribution of surface modifications enables a maximum of light to be conducted, injected from the first end of the casing up to the second end of the casing while ensuring homogeneous diffusion of light along the entire length of the device.

Advantageously in practice, the polymeric optical fibres are fibres based on PMMA. PMMA is indeed a reference material having more attractive flexural elasticity properties than glass fibres. In this case, the device can adopt a lower radius of curvature, consequently adapting to more varied configurations of accommodating supports.

In practice, it has been noted that when the optical fibres are inserted into the casing, the optical fibres have a tendency to rearrange themselves, mixing up such that they are found in a configuration where their treated surfaces are angularly distributed. Indeed, from the manufacturing method described above, the optical fibres all have one surface which has not been exposed to the treatment, and which does not emit light, and which can therefore be qualified as a "blind" area. The bundling and insertion into the casing performs a sort of shuffling of the fibres which means that the blind areas of the fibres are oriented quasi-randomly. This phenomenon may be accentuated by carrying out a slight twisting of the bundle as it is inserted into the casing, by a few turns per meter.

Thus, the quasi-random distribution of the orientation of the so-called blind areas means that the numerous reflection and transmission phenomena over and through the adjacent fibres averages the light intensity emitted over the entire periphery of the bundle, and therefore the casing. In other words, the presence of blind areas, by definition incapable of emitting light, has no effect on the overall intensity emitted.

In other words, the bundling and insertion into the casing allows a shuffling of the optical fibres thus improving the homogeneous distribution of light over the periphery.

Another objective of the invention relates to a woven textile article comprising a lighting device as described above.

Advantageously in practice, the lighting device may be held on the woven article by working with the weft and warp yarns constituting the woven textile article.

Advantageously in practice, the casing has a reflective area capable of reflecting the light emitted by the optical fibres in the direction of a translucent area which is capable of diffusing it. The objective is here to increase the intensity of the light from the device notably at the translucent area with the aim of increasing these lighting capabilities.

BRIEF DESCRIPTION OF THE DRAWINGS

The invention will be well understood and further characteristics and advantages of the invention will become apparent from the description provided below, which is for reference only and is in no way restrictive, with reference to the accompanying figures, wherein:

FIG. 1 is a simplified perspective view of the fabric generated according to the manufacturing method of the invention during the step of weaving the optical fibres within a textile core;

FIG. 1.*a* is an enlarged view of FIG. 1 where the occasional binding yarns on the optical fibres are shown;

FIG. 1.*b* is another enlarged view of FIG. 1 where the binding yarns gathering several optical fibres are shown;

FIG. 1.*c* represents the textile structure with its various areas;

FIG. 2 is a perspective view of the fabric of FIG. 1 during the step of treating the optical fibres;

FIG. 2*bis* is a perspective view of an optical fibre of FIG. 2 having undergone symmetrical treatment;

FIG. 3 is a perspective view of the fabric of FIG. 1, during the step of removing the optical fibres;

FIG. 4 is a perspective view of a casing and a bundle of optical fibres during the step of inserting said bundle into said casing;

FIG. 5 is a collection of schematic cross sections showing various possible geometries for the cross section of the casing;

Figure 6:
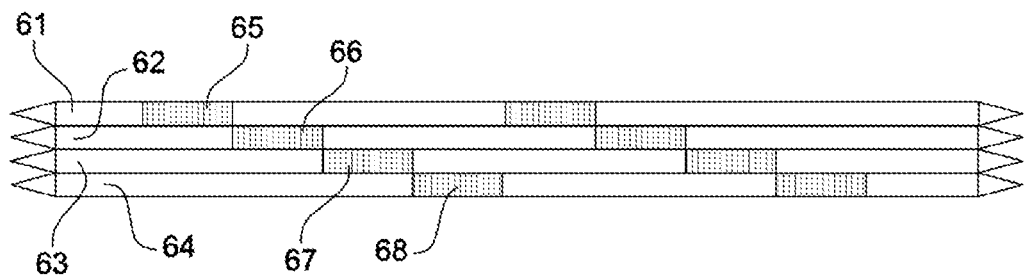
FIG. 6 is a view from above showing one embodiment of the invention enabling dynamic lighting by area.

The invention therefore relates to a reliable, large-scale method for manufacturing lighting devices based on optical fibres that are surrounded by a casing.

The manufacturing method of such a device 100 principally comprises four steps.

As shown in FIG. 1, the first step consists of weaving a textile core 1 in order to hold the optical fibres 5. Said textile core 1 is produced by weaving methods well known to a person skilled in the art. The textile core 1 is composed of warp yarns 4 and weft yarns 3. In practice, the textile core 1 may be produced by a Jacquard type loom to demarcate the areas where the optical fibres 5 are gathered. The textile core 1 may be produced from yarns of between 50 and 500 decitex. The yarns used may be polyester and notably Trevira CS. In practice, polyester is one of the preferred materials for weaving the textile core 1. Indeed, it is a low-cost material, which is available in low counts such as 50 dtex. The textile core is only present to support the optical fibres 5 and enable weaving; the optical fibres 5 then being separated, it is advantageous to use fine, low-cost yarns, while having sufficient mechanical resistance to hold the optical fibres 5.

During the weaving step, the optical fibres 5 are weft-woven in a regular manner, one in two, alternately with the textile weft. According to one embodiment, the optical fibres 5 have a diameter of between 0.1 and 3 mm, preferably close to 0.5 mm.

As shown in FIG. 1, the optical fibres 5 are held within the textile core by binding yarns 2.

As shown in FIG. 1*a*, a binding yarn 2 may hold a single optical fibre; this is known as "occasional" binding 2.

As shown in FIG. 1*b*, a binding yarn 2 may hold several optical fibres 5 at once.

In practice, a binding yarn 2 is formed every 120 weft yarns 3 or warp yarns 4. The use of said binding yarns 2 enables the optical fibres 5 to be held within the textile core 1 with the aim of carrying out the second step, which consists of treating the optical fibres 5.

As shown in FIG. 1*c*, a specific area 10 without binding, known as "floated" may be incorporated at the edge of the weave in order to handle and easily remove the optical fibres 5.

Mechanical treatment may be a blasting treatment which consists in modifying the surface of the optical fibres 5 by spraying an abrasive at high speed, using compressed air, through a nozzle. The abrasive may have an irregular shape. Preferably, the surface modifications caused may be likened to notches. As shown in FIG. 2, the impact of the abrasive on the surface of the optical fibres 5 leads to the formation of surface modifications 8. The treatment of the optical fibres 5 takes place gradually. As shown in FIG. 2, the number of surface modifications 8 formed therefore increases from the first end 51 of the fibres 5 intended to be arranged facing the light source towards the second end 52. The optical fibres 5 thus treated therefore have properties enabling lateral lighting.

According to another embodiment, the surface treatment step is performed during an optical treatment by laser radiation. Treatment by laser radiation also enables a number of surface modifications to be obtained as a function of the intensity of the light available within the light source and the length of the optical fibres.

As shown in FIG. 2*bis*, the treatment of the optical fibres 5 may also be performed in one direction and in the other notably for specific applications when two light sources are used at each of the ends 51, 52 of the optical fibres 5. In this case, this is referred to as symmetrical treatment or "double connection" of the optical fibre 5.

In practice, the textile core 1 is able to withstand the stresses caused during treatment by blasting of the optical fibres 5.

Once the optical fibres 5 are treated, the third step of the manufacturing method, shown in FIG. 3, consists of fully removing said fibres 5 and concomitant insertion of said optical fibres 5 into the casing 9. The joint implementation of removing the optical fibres 5 from the fabric and their insertion into the casing 9 enables the optical fibres 5 to be held parallel and rigid for better control of their insertion.

In practice, as previously mentioned, a binding yarn 2 is formed approximately every 120 weft yarns or warp yarns 4. The choice of a binding yarn every 120 weft or warp yarns also enables the step of removing the optical fibres 5 from the textile core 1 to be facilitated. Indeed, the friction between the optical fibres 5 and the binding yarns 2 is minimized and the removal of the fibres 5 is therefore facilitated. Furthermore, the surface covered by the binding yarns 2 to hold an optical fibre 5 is very small, even negligible, relative to the total surface area of the fibre 5. Notably, for a weave constituted of yarns of 167 dtex, although the mechanical treatment of the fibres 5 is ineffective on the sections of optical fibres 5 covered by the binding yarns 2, it has been observed that this discontinuity of treatment is invisible to the human eye. To the eye, the optical fibres 5 behave as if they had been treated over their entire length.

Another alternative consists of inverting the steps of manufacturing the lighting device 100. Firstly, the optical fibres 5 are gathered by sub-assemblies into a ring 14 after their treatment. The grouping of the optical fibres 5 selected for a sub-assembly may be done using a selection area obtained in accordance with the teachings of patent EP 1 675 985. Preferably, the optical fibres 5 are arranged so as to form a bundle of parallel segments within the ring 14.

This solution enables the assemblies of the optical fibres 5 to be differentiated during the treatment phases for lateral lighting and for the connection of the optical fibres 5 while enabling their insertion without distinction into a same casing.

Indeed, in order to create a lighting device 100 having dynamic lighting supplied by the light sources, it is necessary to keep the bundles of optical fibres 5 separate and therefore to perform the operation of gathering the optical fibres 5 before their extraction from the fabric.

In practice, to make a lighting device 100 having for example a scanning dynamic light, a bundle of optical fibres 5 having only certain light areas is produced. This may be performed by a Jacquard design wherein the light areas are formed by the optical fibres 5 present on the front surface of the fabric and the non-light areas by the optical fibres 5 situated on the back surface, not available for the surface treatment; this may also be carried out by stencil or any other means to create light and non-light areas.

Each group of optical fibres 5 representing an area, is then connected to a light source.

Thus, if all the sources are illuminated at the same intensity and at the same time, the lighting device 100 is completely homogeneous.

As shown in FIG. 6, the lighting device 100 may also be composed of a plurality of sub-bundles 61,62,63,64 of optical fibres 5. Each of the bundles 61,62,63,64 having undergone a particular treatment, the surface modifications of the optical fibres 5 between each of the sub-bundles 61,62,63,64 are therefore carried out in the different areas 65,66,67,68 positioned at staggered levels. Thus, when each of the sub-bundles 61,62,63,64 is illuminated as a result of using the specific light sources for each sub-bundle 61,62, 63,64, a lighting device 100 is obtained enabling marker lights to be produced, which may be very useful notably in signalling applications.

Furthermore, one variant consists of lighting from each side of the device, enabling the possibilities of independent light areas to be multiplied.

The optical fibres 5 are glued to each other inside the ring 14. The glue used may be an opaque epoxy glue, curable in ambient air or under UV. It may notably, at the end 51, enable the fibres 5 to be held in the ring 14 while absorbing the light which passes between the optical fibres 5. Furthermore, it enables the effect of over-intensity to be reduced at the end 51 when the optical fibres 5 are exposed to a light source during the use of the device 100. Thus, it increases the homogeneity of the light intensity of the device 100.

According to another embodiment, the optical fibres may be crimped into the ring.

According to one embodiment, the ring 14 is advantageously a sleeve having a circular cross section. The optical fibres 5 present in the ring 14 are intended to be arranged facing a light source of LED, OLED, LASER type or other light source so as to maximize their exposure. The luminous flux is thus mainly focused on the bundle of optical fibres 5.

The number of fibres 5 per sub-assembly may be set according to the internal diameter of the casing 9 or even by the diameter of the chosen optical fibres 5. In practice, a number of 10 to 20 fibres 5 per casing 9, typically 15 optical fibres, enables an optimal arrangement of the optical fibres 5 to be obtained.

In practice, the removal step is carried out manually by the operator, who gathers a sub-assembly of 15 adjacent optical fibres 5 within the textile core 1. The choice of 15 optical fibres 5 enables a minimum radius of curvature to be obtained, and therefore the greatest curvature properties. This choice also enables the effect of folding the device 100 to be avoided when it is subjected to significant flexing movements.

The final step in the manufacturing method consists of inserting the optical fibres 5 into a casing 9. As shown in FIG. 4, the lighting device 100 is therefore composed of a plurality of 15 optical fibres 5 inserted in a casing 9. The casing 9 has a cylindrical cross section 12 which facilitates the insertion of the optical fibres gathered in a bundle having an overall substantially cylindrical cross section.

In practice, if the external diameter 2 of the casing 9 is 4 mm, then the internal diameter is 2 mm. In this case, the bundle of optical fibres 5 therefore has a diameter slightly less than 2 mm. The translucent nature of the casing 9 enables light emitted by the treated optical fibres 5 to pass through. According to one embodiment, the casing 9 is composed of around 35% low density polyethylene (LDPE), around 35% polypropylene (PP) and around 20% elastomer as well as a small amount of bleaching agents. Thus, the device 100 therefore does not spontaneously degrade. Furthermore, the casing 9 may be translucent.

One variant may consist of adding coloured pigments into the tube, to create a coloured tube.

Advantageously, the material has physico-chemical properties suitable for the intended application. For example, the lighting device 100 has good resistance to UV and fire, but also to chemical products, or even excellent skin compatibility during medical use.

As shown in FIG. 5, the casing 9 can have various geometries selected in accordance with the intended application, such as cylindrical 71, square 72, or triangular 73 geometry, or any other geometry.

Furthermore, the casing 9 can also have a specific geometry enabling it to be held to a support using a piping type geometry 74, tree geometry 75, triangular geometry 76, or any other possible geometry obtained by extrusion.

At the second end 52, the casing 9 can receive a quantity of glue enabling the fibres 5 to be immobilized, while reducing leakage of light in the case of an opaque glue, and thus playing the role of a light plug.

The device 100 may be used alone or integrated into other elements.

Figure 7:
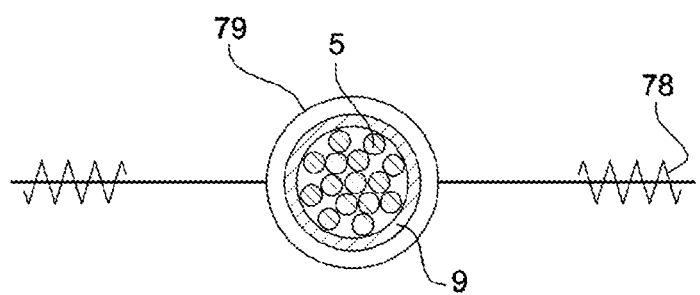
FIG. 7 is a cross section showing the invention in a woven textile article.

As shown in FIG. 7, the device 100 may be integrated into a textile article having an insertion area such as a woven pocket 79.

Said pocket 79 is advantageously woven independently of the device 100 and may be made in different ways depending on the intended application.

According to one embodiment, said pocket 79 is composed only of weft yarns 3 and warp yarns 4, which are adjacent to each other respectively so as to entirely cover the device 100. In this case, the pocket 79 enables the device 100 to be held effectively as well as protecting it. Furthermore, the pocket 79 is advantageously composed of yarns 78 able to allow light emitted by the device 100 to pass through.

One variant consists of a woven textile article equipped with a pocket comprising a sufficient number of yarns to ensure adequate holding of the lighting device. In this case, the yarns constituting the pocket very slightly cover the device. The light emitted by the device is therefore maximum.

Figure 8:
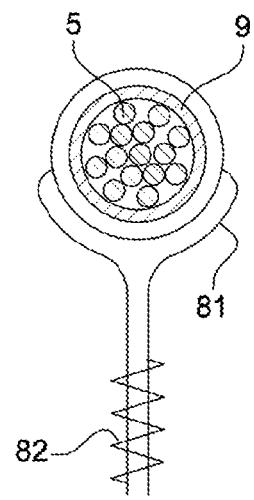
FIG. 8 is a cross section showing the invention in a welt pocket of a textile article.

As shown in FIG. 8, the device 100 may also be integrated into the edging of a textile article. In this case, the device is housed in a welt pocket 81. A sewing thread 82 enables each of the ends of the textile forming the pocket 81 to be joined.

Figure 9:
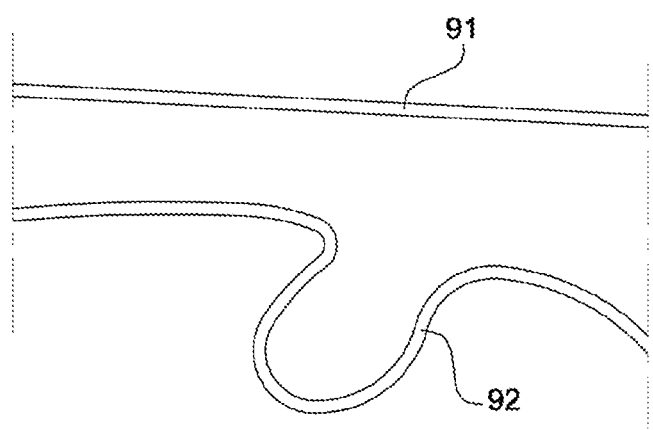
FIG. 9 is a view from above representing the invention in two pockets with different geometries.

Finally, as shown in FIG. 9, the device 100 may also be integrated into a rectilinear shaped 91 or curved 92 pocket depending on the intended application.

The device may be equipped with a casing having specific optical properties for the planned application.

Figure 10:
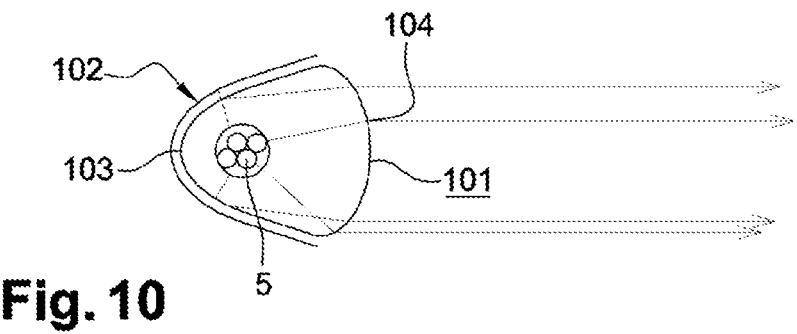
FIG. 10 is a cross section showing one embodiment of the invention wherein the casing has light-reflecting properties.

As shown in FIG. 10, the casing 101 may have a layer 102 of coating applied on a part of its surface to form a reflective area 103 such that the light emitted by the optical fibres 5 is reflected in the direction of the translucent area 104 of the casing that is not covered by the coating.

Generally, the reflective area is preferably oriented from the support side, in order to avoid the light being uselessly absorbed by the support. Conversely, the translucent area of the casing through which the light is emitted is oriented in the direction of the user, in order to increase the apparent luminosity of the device or of a reflective area, if the use of the guide is indirect.

The layer 102 of coating is advantageously metallic and may be carried out by plasma-enhanced chemical vapor deposition (PECVD), atmospheric pressure chemical vapor deposition (APCVD) or even by spray deposition.

According to one variant, the layer of coating may be any type of polymeric material having light-reflecting properties, or giving light-reflecting properties to the casing.

The casing may have diverse geometric shapes also enabling the intensity of the reflected light to be increased.

As shown in FIG. 10, the casing 101 has a combination of two distinct geometries. The reflective area 103 has a parabolic mirror type surface enabling the light from the optical fibres 5 to be reflected in the direction of the translucent area 104. When the optical fibres 5 are positioned close to the site of the reflective surface 103, then the rays generated are reflected in the form of a substantially parallel beam of light, in the direction of the translucent surface 104.

Figure 11:
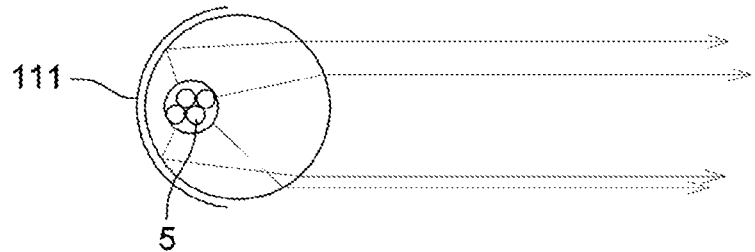
FIG. 11 is a cross section showing a variant of the embodiment of FIG. 10, wherein the casing is in the form of a spherical mirror.

As shown in FIG. 11, the reflective area 111 may have a spherical mirror-type shape.

Figure 12:
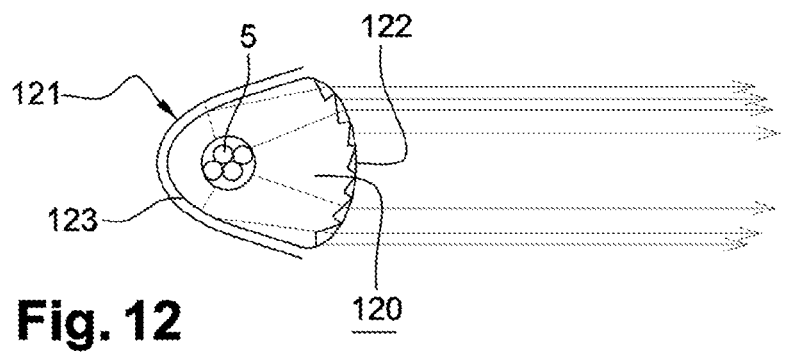
FIG. 12 is a cross section showing a variant of the embodiment of FIG. 10, wherein the casing has a Fresnel lens geometry.

As shown in FIG. 12, the translucent area 122 of the device may have a shape similar to a Fresnel lens or any other device enabling light to be concentrated according to a preferred direction.

The casing 120 is equipped with a layer of metallic coating 121 on the reflective area 123, which has a surface in the form of a parabolic mirror. Furthermore, the translucent area 122 has a surface in the form of a Fresnel lens. Thus, the light emitted from the optical fibres 5 in the direction of the reflective area 123 is reflected by the metallic layer 121 defining the parabolic mirror. The light is completely reflected in the direction of the translucent area 122 having a Fresnel lens function, and it leaves according to a preferred direction depending on the desired application.

Figure 13:
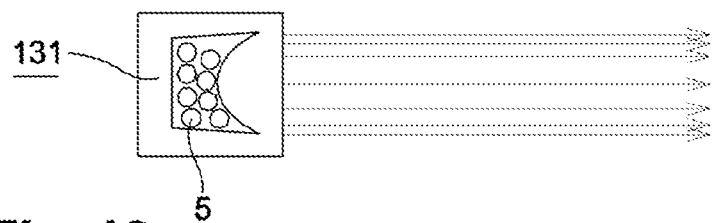
FIG. 13 is a cross section showing a variant of the embodiment of FIG. for which the casing has a variable thickness.

As shown in FIG. 13, the casing 131 can have different thicknesses enabling it to define areas with greater or lesser brightness. Indeed, in the areas where the thickness of the casing 131 is greater, for example in the central part of the casing shown in FIG. 13, the attenuation of the light emitted by the optical fibres 5 is greater. The brightness is therefore a function of the distance traveled by the light through the casing 131, which gives a particular visual effect. Obviously, the variation in thickness can be adapted according to the desired visual effect.

It results from the above that the manufacturing method of the invention has numerous advantages, and in particular it enables the manufacture of lighting devices:

which have homogeneous light intensity over their entire length, including in potential curved areas the properties of which are reproducible on a large scale;

with an integrated method enabling large-scale production at limited cost.

The invention claimed is:

1. A method of manufacturing a lighting device comprising the steps of:
   a) weaving a fabric, comprising:
      warp and weft yarns that form a core of the fabric;
      weft- or warp-woven optical fibres within said fabric, said optical fibres being formed by a core and a sheath surrounding said core; and
      binding yarns forming part of the warp or weft yarns, maintaining said optical fibres (5) inside the fabric;
   b) surface treatment of the fabric comprising optical fibres to modify the surface of said optical fibres;
   c) removing the optical fibres fully from the fabric treated in b); and
   d) inserting a portion of said optical fibres removed from the fabric in step c), grouped together in at least one bundle, into a translucent casing.

2. The method according to claim 1, wherein the step of weaving a fabric introduces a binding yarn no more than every 150 warp yarns.

3. The method according to claim 2, wherein the step of weaving a fabric introduces a binding yarn no more than every 120 warp yarns.

4. The method according to claim 1, wherein further comprising a step which consists of gathering the ends of the optical fibres that are grouped into a bundle, into a ring.

5. The method according to claim 4, wherein said optical fibres are gathered into a ring at a first end of said casing, said ring to be positioned facing the light source of said device.

6. The method according to claim 1, wherein the optical fibres are woven according to a Jacquard design defining sub-bundles resulting in said optical fibres appearing on distinct areas, so that each of the sub-bundles can be connected to independent light sources.

7. The method according to claim 6, comprising a step which consists of gathering the ends of the optical fibres of each of the sub-bundles into separate rings before said sub-bundles are then inserted into said casing.

8. The method according to claim 1, wherein said casing is a homogeneous polymeric material.

9. The method according to claim 1, wherein said casing has means of being held to a support.

10. The method according to claim 8, wherein said casing has a reflective area capable of reflecting light emitted by the optical fibres in the direction of a translucent area, which is able to diffuse it.

11. The method according to claim 9, wherein said casing has a reflective area capable of reflecting light emitted by the optical fibres in the direction of a translucent area, which is able to diffuse it.

12. The method according to claim 5, wherein modifications due to surface treatment of the optical fibres increase by number per unit of length over the length of the fibre going from the first end towards a second end of said casing.

13. The method according to claim 1, wherein said optical fibres are polymer fibres made from methyl polymethacrylate.

14. A lighting device obtained by a method according to claim 1.

15. A woven textile article integrating a lighting device according to claim 14.

16. The textile article according to claim 15, wherein the lighting device works with the weft yarns and warp yarns constituting said woven textile.

* * * * *